Jan. 4, 1927.  F. E. UDE ET AL  1,613,548
LIQUID LEVEL INDICATOR
Filed Oct. 7, 1925
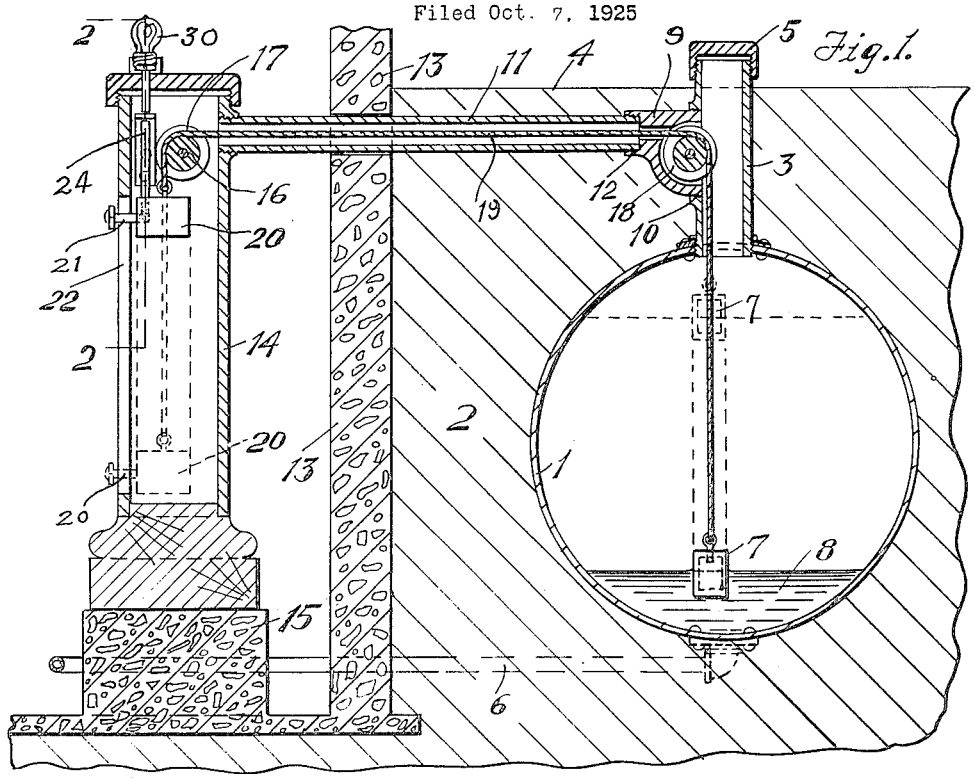
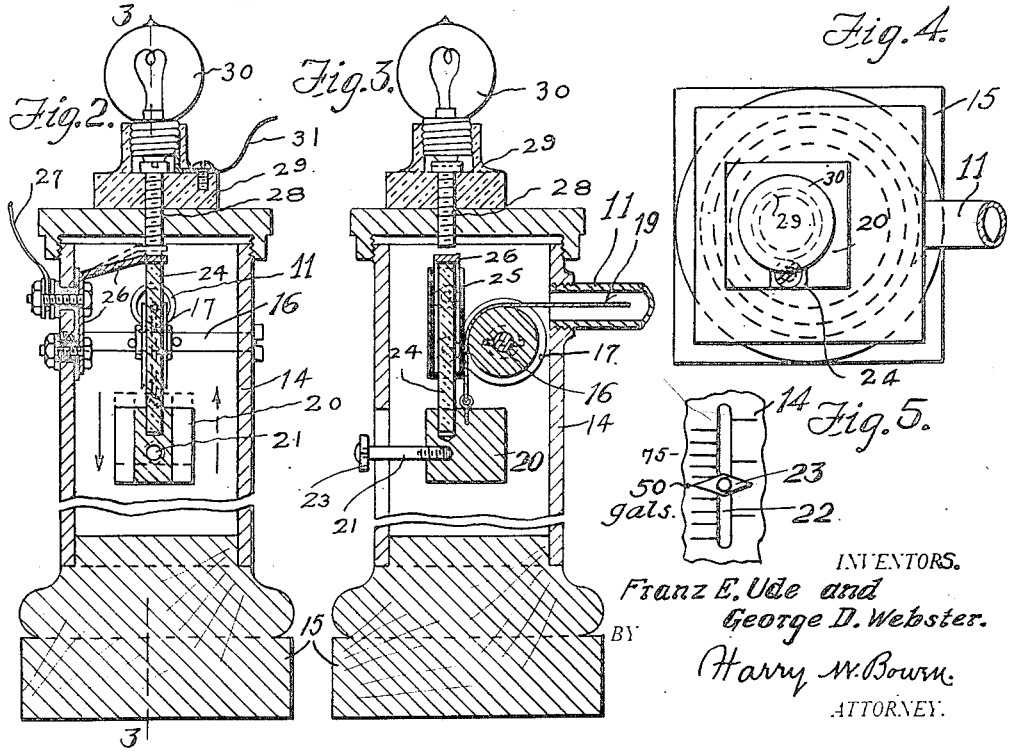
INVENTORS.
Franz E. Ude and
George D. Webster.
BY Harry W. Bowen.
ATTORNEY.

Patented Jan. 4, 1927.

1,613,548

UNITED STATES PATENT OFFICE.

FRANZ E. UDE AND GEORGE D. WEBSTER, OF SPRINGFIELD, MASSACHUSETTS.

LIQUID-LEVEL INDICATOR.

Application filed October 7, 1925. Serial No. 61,113.

This invention relates to improvements in devices for indicating the level of a liquid in a tank or receptacle.

An object of the invention is to provide a device for indicating not only the level of a liquid in a tank but also its volume in gallons at different levels. The improvement is particularly designed and adapted for use in connection with the oil supply tanks which are placed under ground for supplying oil to a hot air furnace, steam or hot water boiler which are used for heating private dwellings, apartment houses, and office buildings. It is also designed and adapted for use in steam generating plants, or, wherever oil as a fuel is employed.

At the present time the householder has no means of constantly determining the quantity of oil in a supply tank and often times the supply of fuel in the tank is completely exhausted before he is aware of the fact, with the result that he is often placed at great inconvenience in obtaining a new supply. My device in general comprises a float which is placed in the fuel supply tank which rises and falls with the level of the oil therein. A flexible member as a chain or wire cable is attached at one end to this float which members extends to a weight to which its other end is attached. Pulleys are provided over which the flexible member passes. The weight is preferably located within the building. Cooperating with this weight is a part thereon which is designed to open and close an electric circuit in which is placed an electric light bulb that will glow when the level of the liquid in the supply tank reaches a predetermined low level or quantity, thereby visually giving notice that the supply should be replenished. These and other objects will appear in the body of the specification and will be particularly pointed out in the claims.

Referring to the drawings:

Fig. 1 is a transverse sectional view through the filling pipe of the supply tank and showing the float and weight and the flexible connection, the level indicating member and the electric light which cooperates with the operating of the weight and float movements.

Fig. 2 is an enlarged sectional view of the weight, and the electric lamp circuit closing means on the line 2—2 of Fig. 1.

Fig. 3 is a sectional view on the line 3—3 of Fig. 2 illustrating the pointer attached to the counter balance weight, the lamp, and one of the supporting pulleys.

Fig. 4 is a top plan view of the indicating housing, and

Fig. 5 is a detail view showing the pointer and scale over which the pointer moves.

Referring to the drawings in detail:

1 designates the oil supply tank which, as shown, is placed below the upper surface of the earth, indicated at 2. The usual filling pipe 3 extends above the surface 4 which is normally closed by the cap 5. The draw off pipe is indicated at 6. 7 designates a float within the tank 1 that rests on the upper surface of the oil 8. 9 designates a housing member which is secured to the filling tube 3 by means of the threads 10. Connected to this member is the tubular member 11 by the threads 12, which member passes through the foundation wall 13 where it has a threaded connection with the housing 14. This may, if desired, be placed on the support 15. 16 designates a fixed shaft which extends across the interior of the housing. Rotatably supported on this shaft is the pulley 17, and rotatably supported in the housing 9 is a pulley 18. 19 is a flexible member as a wire cable, or chain, which passes over these two pulleys to the inner end of which is attached the float 7 and to its outer end is attached the counter balance weight 20 for counter balancing the float 7. 21 is a rod attached to the counter balance weight 20 which extends through the opening 22 of the housing 14, and 23 is a pointer which moves over the scale adjacent the opening 22. This scale is graduated to indicate the number of gallons in the supply tank 1 whereby the observer may readily ascertain the quantity remaining in the supply tank. Attached to the weight 20 is an upwardly extending member 24 formed of insulating material. This member is slidably mounted between the pieces of insulation 25. Secured to the side of the housing 14 is an electric terminal 26 which is electrically connected to the house circuit indicated at 27. The member 26 extends inward over the member 24 and is designed to be moved upward against the terminal 28 which is one terminal of the electric lamp socket 29. The lamp is indicated at 30. The other terminal of the house circuit is indicated at 31. It will therefore be seen that as the float 7 falls the weight 20 rises moving the member 24 upward against the terminal 26 thus closing the circuit to the lamp 30 and visibly indicating the low level of the oil in the supply tank. The pointer 23 will indicate the quantity in gallons of oil 8 in the tank 1:—As for example, 50 gallons as shown in Fig. 5. The light 30 may, of course, be located in any convenient part of the building so that the observer will not fail to notice the light which may be red in color.

This device may be readily installed after the tank 1 is placed under ground by simply removing the filler tube 3, attaching the housing 9, pipe 11 and installing the housing 14 in the interior of the building. The float 7 is of a dimension to permit it to be inserted in the tank 1.

What we claim is:

1. Means for indicating within a building the amount of liquid in an under-ground tank arranged exteriorly of the building, comprising a filler tube for the tank, a housing arranged within the building, a conduit extending through the wall of the building and connecting the filler tube and housing, a float in the tank, a counter-balance weight in the housing, a flexible cable extending through the conduit and having one of its ends connected to the float, and its other end connected to said weight, guide pulleys for said cable, and means on the counter-balance weight and housing for indicating the position of the float in the tank and the quantity of liquid in the latter.

2. Means for indicating within the cellar of a building the amount of liquid in an under-ground tank arranged exteriorly of the building, comprising a filler tube for the tank, a housing connected to said filler tube, a pulley mounted in the housing, a second housing arranged within the cellar of the building, a conduit extending through the wall of the building and connecting said housings, a pulley and counter weight arranged within the second housing, a float in the tank, a flexible cable extending through the conduit, engaging the pulleys and connecting the float and weight, and means on the counter weight and second housing for indicating the position of the float in the tank and the quantity of liquid in the latter.

FRANZ E. UDE.
GEORGE D. WEBSTER.